UNITED STATES PATENT OFFICE.

JOHN ADAM SCHUETZ, OF ST. LOUIS, MISSOURI.

IMPROVEMENT IN ANTI-RHEUMATIC LINIMENTS.

Specification forming part of Letters Patent No. 27,389, dated March 6, 1860.

*To all whom it may concern:*

Be it known that I, JOHN ADAM SCHUETZ, of the city and county of St. Louis, and State of Missouri, have invented a new and useful composition of matter which is especially applicable to and is designed for the cure of rheumatism; and I do hereby declare that the following is a full, clear, and exact description of the manner of making and compounding the same.

Take one-half ounce of the spirits of turpentine, one-half of an ounce of the spirits of hartshorn, one-fourth of an ounce of formic acid, one-quarter of an ounce of stone-oil, one-quarter of an ounce of lard-oil, one-quarter of an ounce of fir-nut oil, and mix them well together, and apply the mixture externally to the parts affected, either by rubbing it on or by saturating a piece of flannel and laying it upon the affected parts.

The degree of strength of the different constituents used in this composition should be a moderate one. This, however, is unimportant, as I claim the right to change the proportions of the said compound—that is to say, the ingredients of which it is composed—so as to increase the strength or decrease it, as circumstances may require. I make the compound out of such ingredients as is furnished at an ordinary drug-shop upon application. One of the above-mentioned ingredients—viz., fir-cone oil—is a thin colorless substance or liquid, free from oxygen, and is obtained by distilling with water the young buds and twigs of the *Pinus abies*, before the said buds or twigs have hardened into wood or pins. The substance is well known to German druggists, and is used in medicines.

What I claim as my invention is—

The compound composed of the afore-mentioned ingredients.

JOHN ADAM SCHUETZ.

Witnesses:
 AMOS BROADNAX,
 P. W. JOHNSTONE.